(12) United States Patent
Swenson (10) Patent No.: US 8,516,794 B2
(45) Date of Patent: Aug. 27, 2013

(54) ECONOMIC MEANS OF ASPIRATING A FUEL COMBUSTION ENGINE WITH NON-ATMOSPHERIC GASES TO PRODUCE A SUBSEQUENTLY USEFUL BYPRODUCT

(75) Inventor: Roger J. Swenson, Salt Lake City, UT (US)

(73) Assignee: Consolidated Energy Systems, LLC, Salt Lake City, UT (US)

( * ) Notice: Subject to any disclaimer, the term of this patent is extended or adjusted under 35 U.S.C. 154(b) by 702 days.

(21) Appl. No.: 12/635,683

(22) Filed: Dec. 10, 2009

(65) Prior Publication Data

US 2012/0060470 A1 Mar. 15, 2012

Related U.S. Application Data

(60) Provisional application No. 61/121,367, filed on Dec. 10, 2008.

(51) Int. Cl.

| F02M 25/06 | (2006.01) |
|---|---|
| F02B 27/04 | (2006.01) |
| F02C 1/06 | (2006.01) |
| F02C 6/00 | (2006.01) |
| F02C 1/00 | (2006.01) |
| E21B 41/02 | (2006.01) |

(52) U.S. Cl.
USPC ............... 60/273; 60/278; 60/39.17; 60/772; 166/244.1

(58) Field of Classification Search
USPC ............... 60/281, 278, 39.183, 772; 96/234
See application file for complete search history.

(56) References Cited

U.S. PATENT DOCUMENTS

| 3,982,878 | A | * | 9/1976 | Yamane et al. | 431/2 |
|---|---|---|---|---|---|
| 4,064,840 | A | * | 12/1977 | Vierling | 123/3 |
| 4,899,544 | A | * | 2/1990 | Boyd | 60/618 |
| 8,046,984 | B1 | * | 11/2011 | Schechter | 60/39.27 |
| 2007/0237696 | A1 | * | 10/2007 | Payton | 423/228 |
| 2010/0024381 | A1 | * | 2/2010 | Ackermann et al. | 60/39.17 |
| 2012/0273204 | A1 | * | 11/2012 | De Francesco | 166/305.1 |

* cited by examiner

*Primary Examiner* — Thomas Denion
*Assistant Examiner* — Anthony Ayala Delgado
(74) *Attorney, Agent, or Firm* — Steven Rinehart (57) ABSTRACT

Aspirating a fuel combustion engine with non-atmospheric gases to produce exhaust that can be efficiently used as EOR working fluid and/or recirculated in subsequent fuel combustion processes. The EOR working fluid is made up of a combination of gases created in a combustion process in a power-producing fuel combustion engine. This combustion process occurs using a mix of initial combustion ingredients that includes $CO_2$ and relatively pure oxygen in the proportion required by the specific combustion device and the specific hydrocarbon fuel. The oxygen may be produced in lower value off peak periods and is stored until it is required. Where EOR or EGR working fluid has been injected into geologic formations and has then been re-circulated through the production process and provided to the engine combustion gas, there will typically be hydrocarbon components that the present invention makes use of to provide a portion or all of the fuel requirements for the engine power production system.

19 Claims, 6 Drawing Sheets

ECONOMIC MEANS OF ASPIRATING A FUEL COMBUSTION ENGINE WITH NON-ATMOSPHERIC GASES TO PRODUCE A SUBSEQUENTLY USEFUL BYPRODUCT

CROSS-REFERENCES TO RELATED APPLICATION

This application is a continuation-in-part of, and claims priority to, U.S. Provisional Patent Application No. 61/121,367 entitled "Economic Production of $CO_2$ Working Fluid for Enhanced Oil Recovery and Enhanced Gas Recovery Processes" and filed on Dec. 10, 2008 for Roger J. Swenson, which is incorporated herein by reference.

BACKGROUND OF THE INVENTION

1. Field of the Invention

The present invention relates generally to the field of petroleum production processes. More specifically, the present invention relates to the economic manufacture of a working fluid composed mainly of liquefied $CO_2$, but including other acceptable impurities, for use in enhanced production of oil or natural gas from underground formations also known as enhanced oil recovery (EOR) or enhanced gas recovery (EGR) respectively. This invention also relates generally to the use of this new mechanism for the production of the EOR and EGR working fluid specifically for the EOR or the EGR operations.

2. Description of the Related Art

Crude oil is generally extracted from petroleum reservoirs in three successive phases: primary recovery, secondary recovery, and tertiary recovery. Crude oil is recovered in the primary recovery phase through an extraction process which makes use of natural pressure, gravitational forces, drilling and pumping to lift the crude oil to the surface.

The secondary production phase, or secondary recovery, makes use of liquid displacement techniques such as water flood techniques, to force crude oil to the surface.

Tertiary production, also known as enhanced oil recovery (EOR), makes use of thermal, chemical or gaseous injections into oil-bearing stratum to force crude oil from subterranean production reservoirs. $CO_2$ gas injections account for about half of the EOR operations currently ongoing in the United States. As oil production fields mature, EOR is increasingly the technique of choice to improve crude oil production from declining petroleum reservoirs.

Most $CO_2$ used in EOR originates in natural underground reservoirs. These natural $CO_2$ reservoirs are generally not located near oil producing basins, necessitating the construction of pipelines to carry liquefied $CO_2$ long distances from remote $CO_2$ production areas to the EOR fields where the $CO_2$ is needed.

Some anthropogenic sources of $CO_2$ are used as $CO_2$ production sources. These sources include fertilizer production and synthetic natural gas production operations, from which $CO_2$ can be captured The production of $CO_2$ EOR streams from power generation plants has been proposed, but significant technological and economic barriers exist with the technologies that have to date been investigated.

Enhanced gas recovery (EGR) makes use of the same techniques as EOR but with the goal of recovering gases, such as natural gas, rather than petroleum crude. EGR has not generally been found to be economical in light of the costs associated with the production of such gas exceed the value of the petroleum gas derived, because, inter alia, once $CO_2$ begins to re-circulate from injection into EGR production the cost of processing the $CO_2$ out of such EGR produced gas again reduces the economic viability of EGR production.

SUMMARY

From the foregoing discussion, it should be apparent that a need exists for a means of removing contaminants from petroleum coke. Beneficially, such a means would process petroleum coke such that it is usable for some of the same applications that are lighter hydrocarbons, including powering internal combustion engines.

The present invention has been developed in response to the present state of the art, and in particular, in response to the problems and needs in the art that have not yet been fully solved by currently available inventions. Accordingly, the present invention has been developed to provide a means of processing petroleum coke for use in internal combustion engines that overcomes many or all of the above-discussed shortcomings in the art.

It is an object of the present invention to provide a system and method of aspirating a fuel combustion engine with non-atmospheric gases to produce a subsequently useful byproduct in EOR and fuel combustion. The steps of the method comprise sequestering $CO_2$ from either an underground cavity or from other atmospheric gases or industrial sources using an air separation unit such that the sequestered $CO_2$ gas comprises at least 90% $CO_2$ by weight, then combining the sequestered $CO_2$ gas with a predetermined amount of oxygen gas comprising at least 90% $O_2$ by weight to create a precombustion gas stream consisting of the sequestered $CO_2$ gas and the oxygen gas; and aspirating a fuel combustion engine exclusively with the precombustion gas stream, wherein the fuel combustion engine internally combusts the precombustion gas stream with a hydrocarbon fuel.

The method proceeds with collecting exhaust gas from the fuel combustion engine, wherein the collected exhaust gas comprises $CO_2$ created during fuel combustion, and wherein the collected exhaust gas comprises greater quantities of $CO_2$ than existed in the precombustion gas stream; and removing $O_2$ from the collected exhaust gas such that the collected exhaust gas comprises less than 5% $O_2$ by weight.

In some embodiments, the method further comprising a step of recirculating a portion of the collected exhaust gas through one or more of the fuel combustion engine; and a second fuel combustion engine with greater engine displacement, wherein the second fuel combustion engine is exclusively aspirated by non-atmospheric gases comprising the collected exhaust gas and an oxygen gas comprising more than 90% $O_2$ by weight.

In other embodiments, the method further comprises the steps of repeatedly recirculating the collected exhaust gas through subsequent fuel combustion processes until contaminants in the collected exhaust gas exceed a predetermined threshold; and releasing the collected exhaust gas into the atmosphere.

In still further embodiments, the method further comprises the step of circulating a portion of the collected exhaust gas through an oil-bearing subterranean stratum during an enhanced oil recovery (EOR), where in the collected exhaust gas serves as the working fluid in the EOR.

In alternate embodiments of the present invention, the collected exhaust gas is stored in working fluid container prior to being used in EOR. The method may also comprise the steps of recollecting a portion of any collected exhaust gas used in EOR, wherein the collected exhaust gas was used as working fluid in the EOR and wherein the recollected exhaust gas is contaminated with unrefined hydrocarbons introduced to the recollected exhaust gas during EOR; and aspirating a subsequent fuel combustion engine with the recollected exhaust gas, such that the unrefined hydrocarbon contaminants replace one of: all of the hydrocarbon fuel otherwise necessary to power the subsequent fuel combustion engine, and a portion of the hydrocarbon fuel otherwise necessary to power the fuel combustion engine.

The method may also comprise the steps of: cooling the collected exhaust gas; and cleaning the collected exhaust gas by filtering one or more impurities harmful in EOR. In some embodiments, the predetermined amount of oxygen gas is predetermined by referencing historical data to create optimal combustion performance in the fuel combustion engine.

The method may further comprise the steps of: diverting the $O_2$ removed from the collected exhaust gas to storage chamber; and using the $O_2$ collected in the storage chamber to aspirate a subsequent fuel combustion engine.

The hydrocarbon fuel, in some embodiments, may comprise micronized petroleum coke. The method may further comprise the step of supplementing the sequestered $CO_2$ with $CO_2$ mined from a natural, subterranean, geological $CO_2$ reservoir.

Additionally, the present invention recites a working fluid produced using the claimed method. A system with modules configured to substantially perform the steps of the method is recited in the present invention.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are provided. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
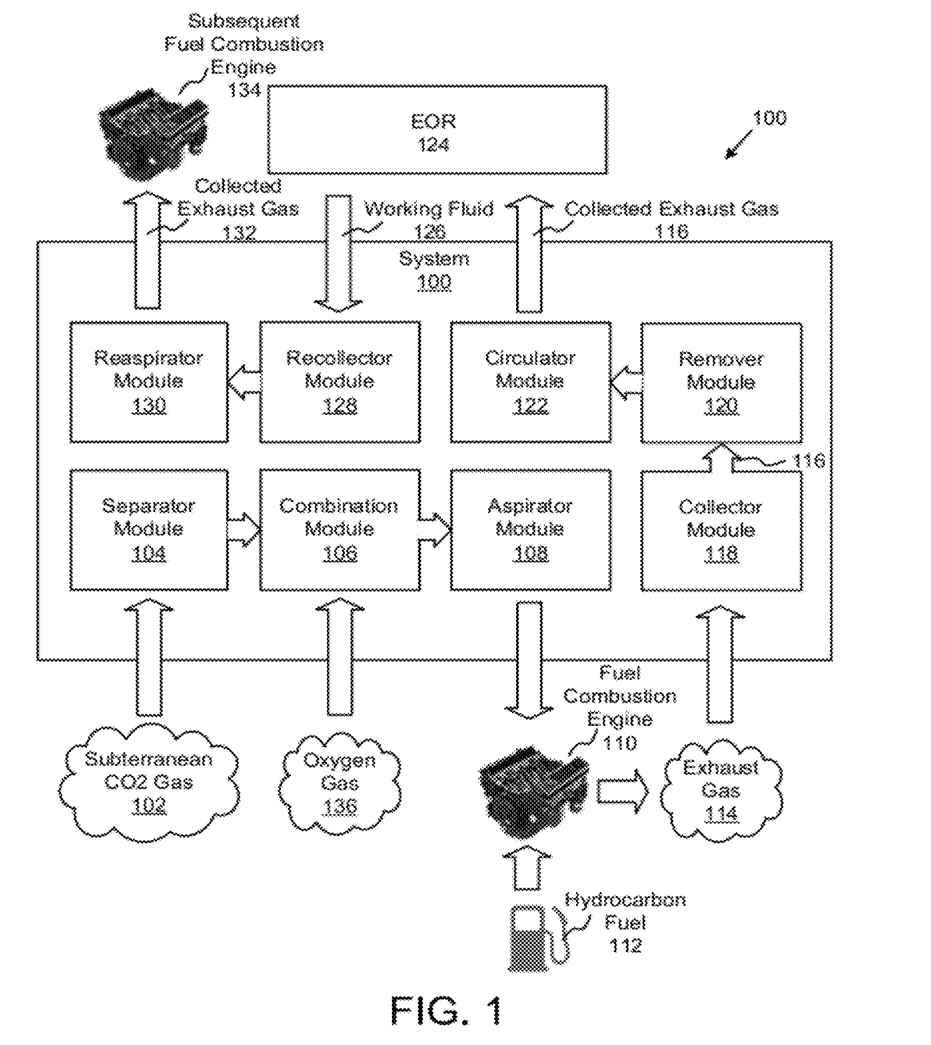
FIG. 1 sets a block diagram illustrating one embodiment of a system that aspirates a plurality of fuel combustion engines with non-atmospheric gases to produce a subsequently useful byproduct in EOR in accordance with the present invention.

FIG. 1 sets forth a system for aspirating a plurality of fuel combustion engines with non-atmospheric gases to produce a subsequently useful byproduct in EOR in accordance with the present invention. The system 100 comprises a separator module 104, a combination module 106, an aspirator module 108, a fuel combustion engine 110, a collector module 118, a remover module 120, a circulator module 122, a recollector module 128, a reaspirator module 130, and subsequent fuel combustion engine 134. A subterranean $CO_2$ gas serves various purposes as it is circulated through the various modules of the system 100, which system 100 also makes use of a hydrocarbon fuel 112, an oxygen gas 136, and an enhanced oil recovery (EOR) operation 124.

The subterranean $CO_2$ gas 102, in the shown embodiment, is mined, extracted, or piped up from natural underground cavities containing $CO_2$ gas often mixed with other gases such as natural gas. The subterranean $CO_2$ gas 102 may be used as working fuel in EOR 124 operations or enhanced gas recovery (EGR) operations after being used in a fuel combustion device and before again being used in a fuel combustion device such as the subsequent fuel combustion engine 134.

In some embodiments of the present invention, the $CO_2$ gas 102 is mined, extracted, or removed from atmospheric gas or ambient air. In other embodiments, the subterranean $CO_2$ gas 102 is derived exclusively or in part from the exhaust of fuel combustion devices, including, but not limited to, the fuel combustion engine 110 or the subsequent fuel combustion engine 134.

The subterranean $CO_2$ gas may also comprise re-circulated EOR or EGR working fluid that has been used with oil or gas production. The subterranean $CO_2$ gas may be from a natural source or it may be from a man made source of $CO_2$.

The separator module 104, in some embodiments of the present invention, subjects the $CO_2$ gas to a purification process before circulating the $CO_2$ gas 102 through the system 100. The separation module 104 may separate nitrogen, oxygen, argon, natural gas, and/or other impurities are scrubbed, filtered, or removed from the $CO_2$ gas using methods well-known to those of skill in the art, including gas separation units which make use of various technologies, including cryogenic distillation, membrane, pressure swing adsorption, and vacuum pressure swing adsorption. In other embodiments, the separator module 104 only partially separates inert or unwanted gases from the subterranean $CO_2$ gas until the subterranean $CO_2$ gas reaches a predetermined purity threshold.

The predetermined purity threshold may be set by referencing historical data comprising engine performance figures, environmental emissions requirements, or by a computer measuring the real-time performance of the fuel combustion engine 110 or the subsequent fuel combustion engine 134.

The combination module 106 is configured to combine the subterranean $CO_2$ gas with an oxygen gas 136 stored and isolated in a storage tank or container, which oxygen gas 136 comprises a higher percentage of $O_2$ by weight and/or volume than the ambient air surrounding the oxygen tank. The precombustion gas stream consists of the $CO_2$ gas and oxygen gas combined by the combination module 106. In some embodiments, the oxygen gas 136 is derived from ambient air subjected to an air separation process. In other embodiments, the oxygen gas 136 is derived from exhaust exiting the fuel combustion engine 110 through a flue or otherwise, the subsequent fuel combustion engine 134, or another fuel combustion device.

In some embodiments of the present invention, the combination module 106 combines the subterranean $CO_2$ gas 102 with the oxygen gas 136 in ratios predetermined by a human operator to give optimal performance characteristics to the fuel combustion engine 110 or to comply with environmental regulations. In other embodiments, the combination module 106 is configured to permit the fuel combustion engine 110 to draw increasing rations of the oxygen gas 136 as the engine RPMs increase or decrease during fuel combustion.

The ratio to which oxygen is combined in the precombustion gas stream with the subterranean CO2 gas 102 may fluctuate with atmospheric conditions and the model and make the fuel combustion engine 110, as well as the specific ratio of carbon and hydrogen in the hydrocarbon fuel 114.

The aspirator module 102, in the shown embodiment, aspirates the fuel combustion engine 110 with the precombustion gas stream and a hydrocarbon fuel 112.

The hydrocarbon fuel 112 may comprise any hydrocarbon fuel well-known to those of skill in the art, including gasoline, kerosene, coal, jet fuel, and the like. The hydrocarbon fuel may also comprise micronized petroleum coke.

The fuel combustion engine 110 may comprise any fuel combustion device well-known to those of skill in the art, including an internal combustion engine, gas turbine engine, external combustion engine, rotary combustion engine, or even boiler, oven, water heaters, cyclone furnaces, steam generators, and the like.

In some embodiments of the present invention, heat given off by the fuel combustion is used in steam-generators or the like to generate mechanical or electrical energy used in EOR or EGR.

The exhaust gas 114 consists of the gases emitted exclusively by the fuel combustion engine 110. Exhaust gases are usually emitted from a fuel combustion engine via a flue, which is a pipe or device that channels the exhaust gases from the engine. The exhaust gases from engines that are aspirated by ambient air usually comprise principally of nitrogen. In the shown embodiment, the exhaust gas 114 comprises little to no nitrogen because the fuel combustion engine 110 is aspirated exclusively by a precombustion stream consisting of the subterranean $CO_2$ gas and the oxygen gas, both of which has been scrubbed for nitrogen pollutants.

The collector module 118 collects the exhaust gas 114 from the exhaust flue. In some embodiments, a collector module 118 compresses the exhaust gas 114 to between 1 and 30 atmospheres. In other embodiments, the collector module 118 compresses the exhaust gas 114 until changes states to a liquid. The exhaust gas 114 collected and/or compressed by the collector module 118 becomes collected exhaust gas 116.

The remover module 120 removes oxygen impurities from the collected exhaust gas 116 using methods well-known to those of skill in the art. In some embodiments, the removed oxygen gas is diverted into persistent storage for use by the combination module 106 or directly to the aspirator module 108, the fuel combustion engine 110 or the subsequent fuel combustion engine 134. In other embodiments, the exhaust gas 116 is cooled by the remover module 120. In other embodiments, the remover module 120 removes water $H_2O$ and diverts it to storage for use in oil and/or gas recovery operations.

The circulator module 122, in some embodiments, forces all of, or a portion of, the collected exhaust gas through an oil-bearing subterranean stratum during an EOR or EGR, where in the collected exhaust gas serves as the working fluid 126 in the EOR or EGR.

The recollector module 128 collects the working fluid 126 after it is forced back to the surface using methods well-known to those of skill in the art in EOR or EGR operations. In some embodiments, the recollector module 128 routes the working fluid 126 to the separator module 104 or the combination module 106 where it is scrubbed and combined into a second precombustion gas stream for use in the subsequent fuel combustion engine 134. In other embodiments, the recollector module 128 routes the working fluid 126 straight to the reaspirator module 132, which uses the working fluid 126.

Like the fuel combustion engine 110, the subsequent fuel combustion engine 134 may comprise any fuel combustion device well-known to those of skill in the art, including an internal combustion engine, gas turbine engine, external combustion engine, rotary combustion engine, or even boiler, water heaters, cyclone furnaces, industrial generators and generation systems, and the like.

In one embodiment, the subsequent fuel combustion engine comprises an internal combustion engine with larger piston volume displacement than the fuel combustion engine 110. As the subterranean $CO_2$ gas 102 is circulated through the system 100, it becomes collected exhaust gas 116, working fluid 126, and finally again collected exhaust gas 132. Its volume is augmented throughout these processes due to the fact that the combustion process which the subterranean $CO_2$ gas 102 is subjected to in the fuel combustion engine 110 creates new $CO_2$ gas from the oxygen and hydrocarbon fuel and the fact that the EOR 124 contaminates the collected exhaust gas 116 with unrefined hydrocarbons which again augment its volume. For this reason, in some embodiments of the present invention, the amount of $CO_2$ gas ultimately reaching the subsequent fuel combustion engine 134 is larger than the amount of subterranean $CO_2$ gas originally mined from an underground cavity and therefore useful in powering a larger subsequent fuel combustion engine 134.

The process or recirculating the collected exhaust gas 132 through additional fuel combustion engines may be repeated perpetually. In some embodiments of the present invention, the recirculation process is repeated until impurities or pollutants in the collected exhaust gas 132 exceed a predetermined threshold, at which time the collected exhaust gas 132 is released into the atmosphere.

In some embodiments of the present invention, the subsequent fuel combustion engine 134 is powered by the hydrocarbon pollutants collected in the working fluid 126 during 124 rather than a hydrocarbon fuel 112. In other embodiments, the hydrocarbon pollutants are substituted for only a portion of the hydrocarbon fuel 112.

Figure 2A:
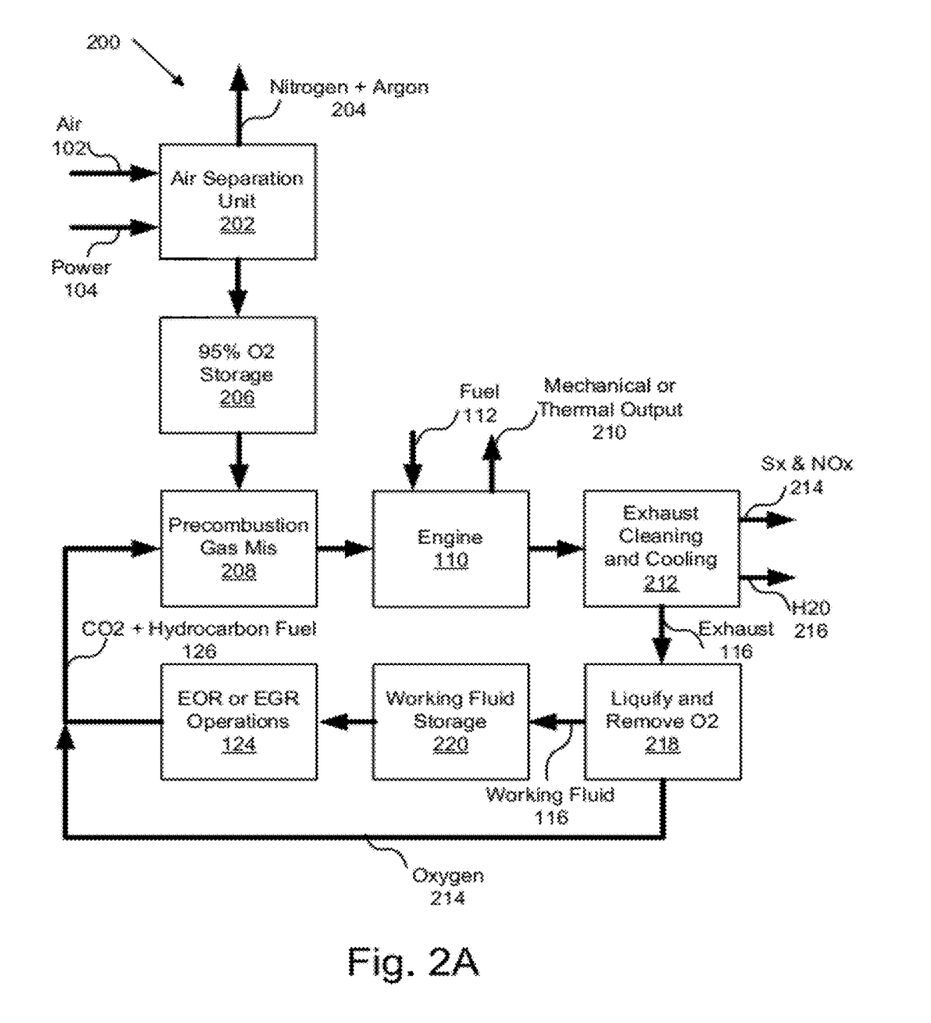
FIG. 2A sets forth one embodiment of a basic process flow diagram in accordance with the present invention.

FIG. 2A sets forth one embodiment of a basic process flow diagram in accordance with the present invention as previously set forth in the parent provisional application.

In the shown embodiment, ambient air 102 is separated by an air separation unit 202, which scrubs nitrogen, and other impurities from the ambient air 102 until all that remains is $O_2$ gas comprising smaller amounts of impurities than exist in the surrounding ambient air.

In this shown embodiment, the subterranean $CO_2$ gas is stored in storage. The $O_2$ gas separated from the ambient air is also contained in Storage 206. The subterranean $CO_2$ gas comprises 95% $CO_2$ by volume in the shown embodiment. The subterranean $CO_2$ gas is mixed in the precombustion gas module 208 with working fluid 126 from EOR or EGR activities which comprises raw hydrocarbons that contaminated the working fluid 126 during EOR or EGR operations. The subterranean $CO_2$ gas is also combined with a predetermined amount of oxygen from the Storage 206 or oxygen garnered from liquefy and remove module 218, which liquefies and removes oxygen from collected exhaust gas 116.

Figure 2B:
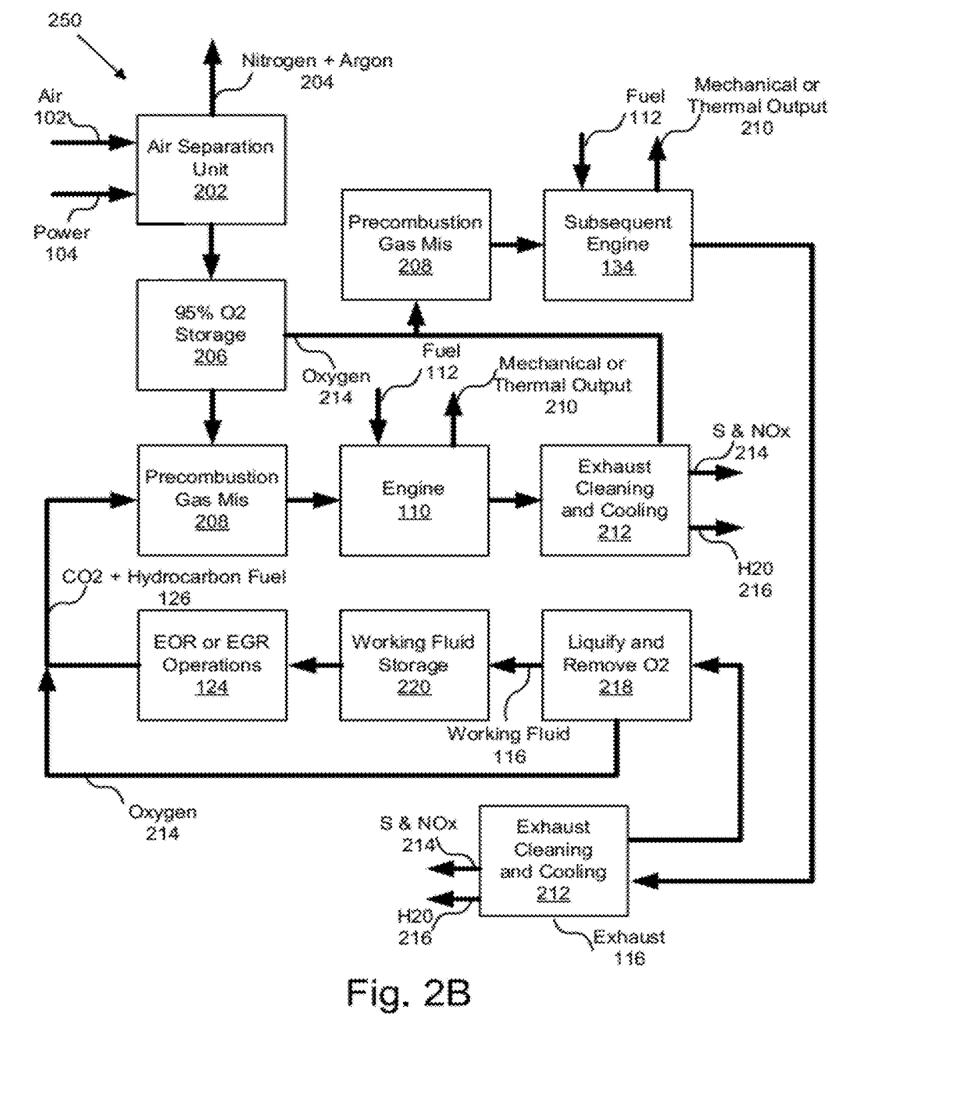
FIG. 2B sets forth a second embodiment of a basic process flow diagram in accordance with the present invention.

FIG. 2B sets forth a second embodiment of a basic process flow diagram in accordance with the present invention.

In this shown embodiment, the subterranean $CO_2$ gas is stored in Storage 206. The subterranean $CO_2$ gas comprises 95% $CO_2$ by volume in the shown embodiment. The subterranean $CO_2$ gas is mixed in the precombustion gas module 208 with working fluid 126 from EOR or EGR activities which comprises raw hydrocarbons that contaminated the working fluid 126 during EOR or EGR operations. The subterranean $CO_2$ gas is also combined with a predetermined amount of oxygen garnered from liquefy and remove module 218, which liquefies and removes oxygen from collected exhaust gas 116.

FIG. 2 illustrates an embodiment of this invention using a series of combustion devices making exclusive use of external $CO_2$ gas sources that are combined with a relatively oxygen purified to greater than 90% oxygen by volume. The external source of $CO_2$ gas is recirculated through the engines 110 and 134 after EOR or EGR working fluid that has been used in oil or gas production. The combustion in engines 110 and 134 produces additional $CO_2$ gas and $H_2O$. In some embodiments of the present invention hydrogen is not scrubbed out of the $O_2$ gas or the precombustion gas stream. In accordance with those embodiments, the engines 110 and 134 and the modules aspirating them may be configured to alternately produce varying amounts of water or $CO_2$ to meet the needs of an EOR or EGR operation.

Figure 2C:
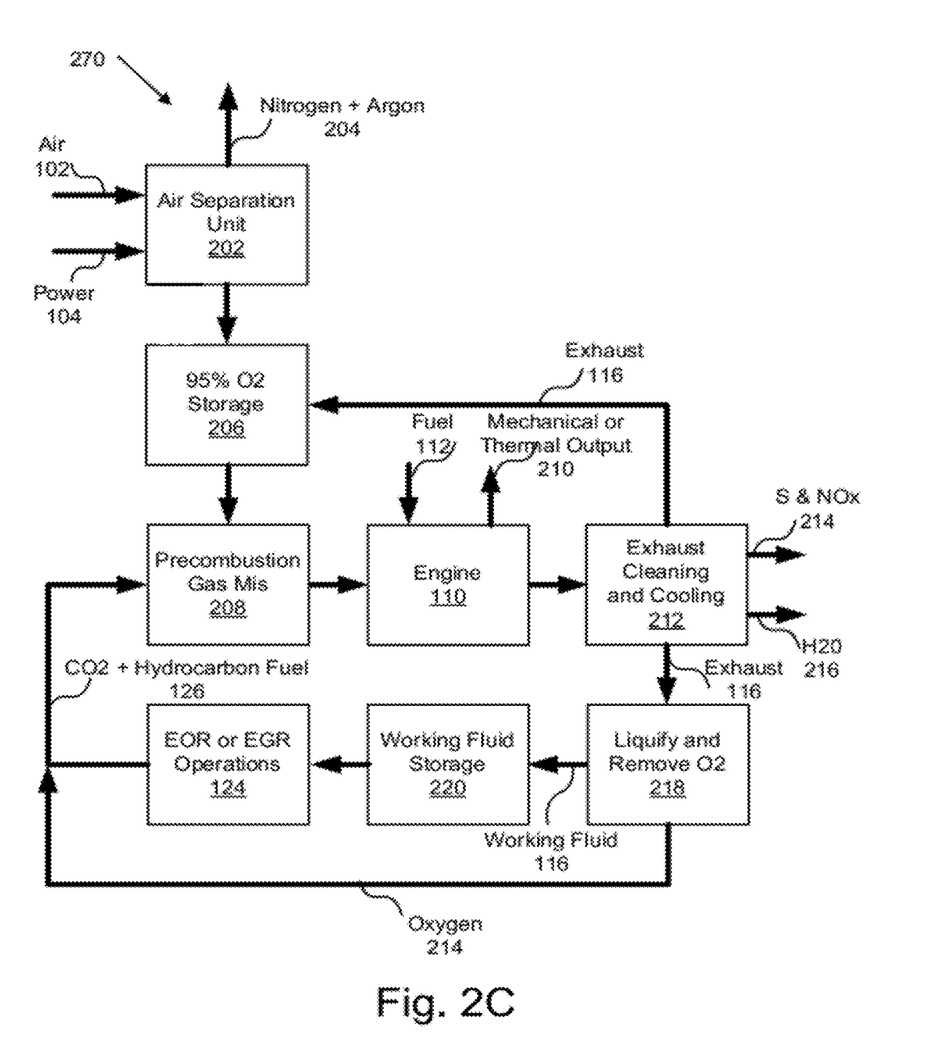
FIG. 2C sets forth a third embodiment of basic process flow diagram in accordance with the present invention.

FIG. 2C sets forth a third embodiment of basic process flow diagram in accordance with the present invention.

FIG. 2C shows an embodiment of the present invention in which exhaust 114 is looped throughout the combustion system 270 as the $CO_2$ source. The exhaust 114 from the fuel combustion engines 110 and 134 is then cleaned and cooled. The collected exhaust 116 may scrubbed, filtered or cleansed into compliance with a predetermined balance of impurities. Impurities removed from the exhaust 116 may be routed back to the pre-combustion gas stream or EGR or EOR. The remaining exhaust 116 is then liquefied and deoxygenated, with removed oxygen stored for use in one or more fuel combustion systems or devices.

Figure 3:
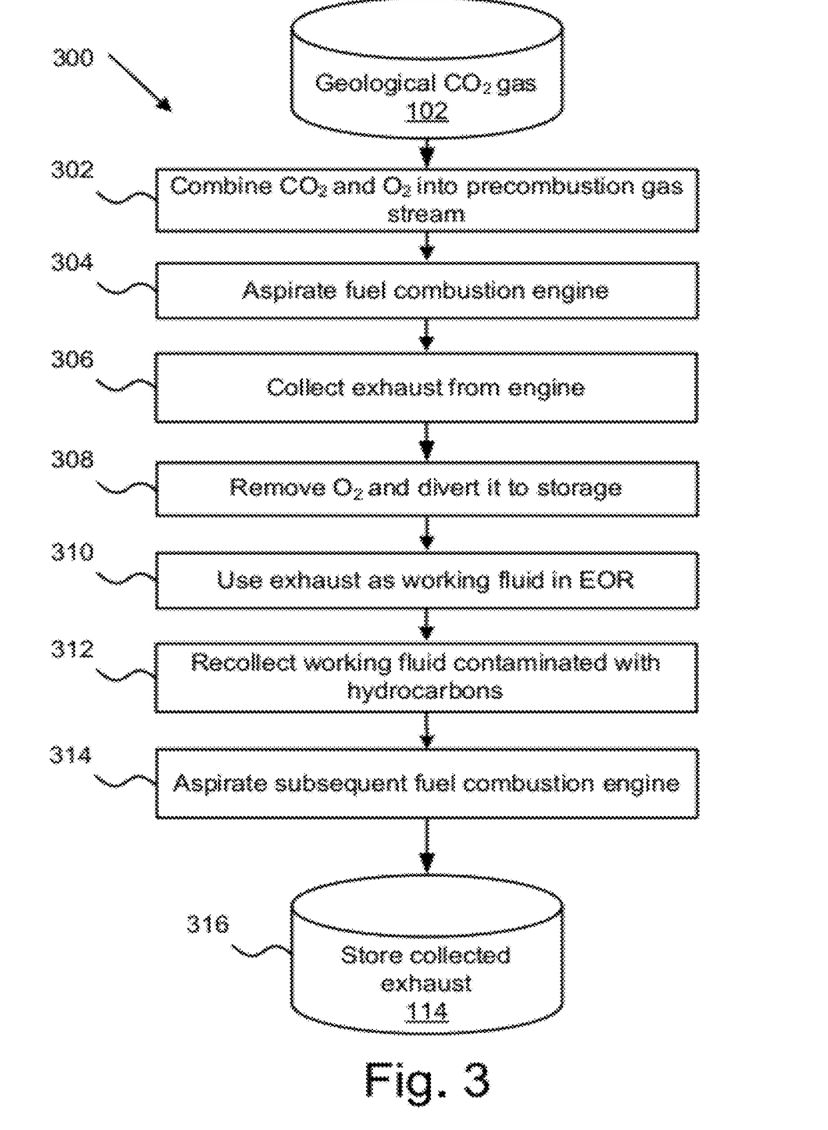
FIG. 3 is a flow chart of a method of aspirating a fuel combustion engine with non-atmospheric gases to produce a subsequently useful byproduct in accordance with the present invention.

FIG. 3 is a flow chart of a method 300 of aspirating a fuel combustion engine with non-atmospheric gases to produce a subsequently useful byproduct in accordance with the present invention.

The $CO_2$ gas is stored before the method begins 302. The method 300 proceeds as shown in the shown embodiment, substantially incorporating the above described features, functions, and characteristics.

Figure 4:
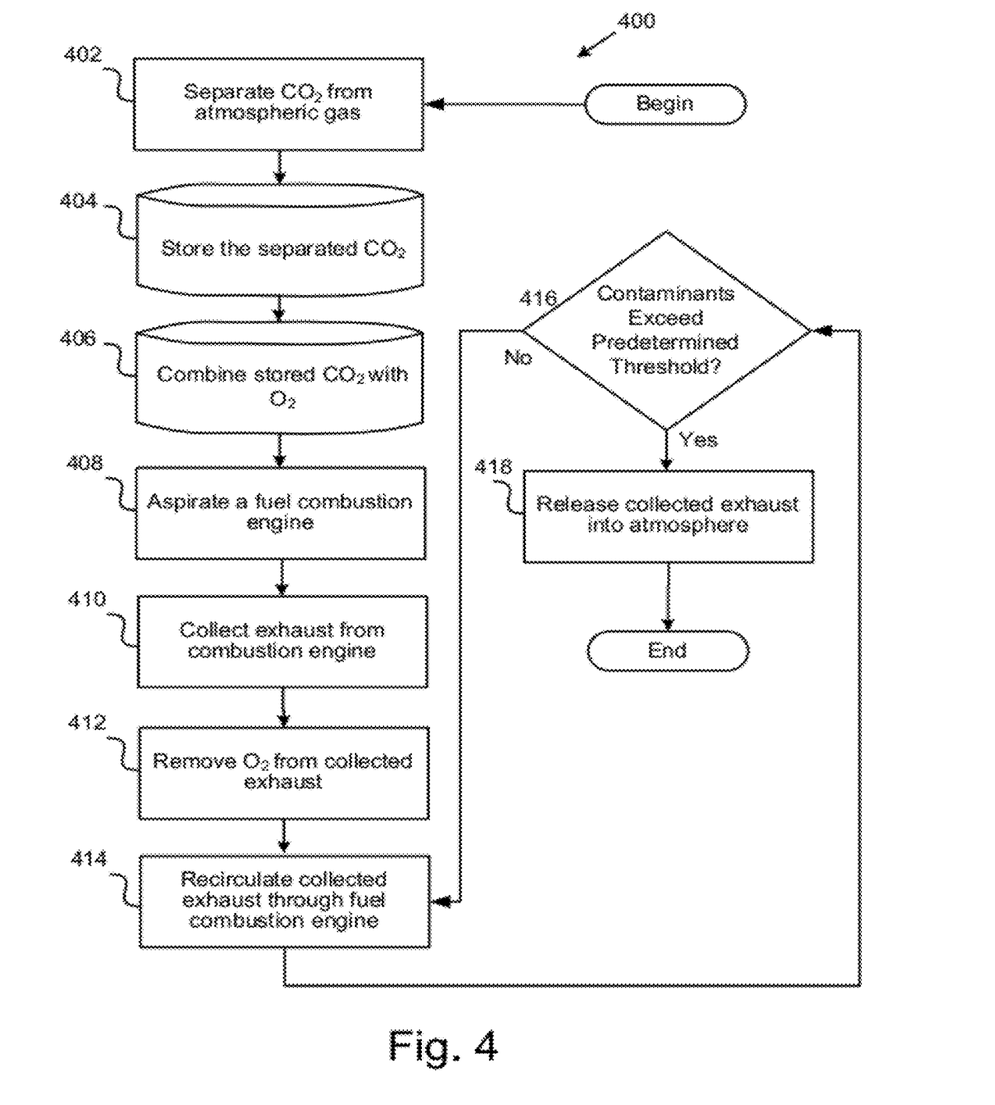
FIG. 4 is a flow chart of an alternate method of aspirating a fuel combustion engine with non-atmospheric gases to produce a subsequently useful byproduct in accordance with the present invention.

FIG. 4 is a flow chart of an alternate method 400 of aspirating a fuel combustion engine with non-atmospheric gases to produce a subsequently useful byproduct in accordance with the present invention.

In the shown embodiment 400, the exhaust gases 114 are repeated recirculated through subsequent fuel combustion devices until contaminants exceed a predetermined threshold, at which time they are released into the atmosphere. In alternate embodiments, the contaminants are released for incineration, catalytic conversion, or other disposal processing.

The method 400 proceeds as shown in the shown embodiment, substantially incorporating the above described features, functions, and characteristics.

In alternate embodiments of the present method 400, the $CO_2$ gas used in step 302 is derived from a combination of sources, including subterranean cavities, exhaust 114 from fuel combustion engines, and/or ambient air atmospherically separated.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of aspirating a fuel combustion engine with non-atmospheric gases to produce a subsequently useful byproduct, the steps of the method comprising:
   sequestering $CO_2$ gas from an subterranean cavity;
   combining the sequestered $CO_2$ gas with a predetermined amount of oxygen gas comprising at least 90% $O_2$ by weight to create an precombustion gas stream comprising the sequestered $CO_2$ gas and the oxygen gas;
   aspirating a fuel combustion engine exclusively with the precombustion gas stream, wherein the fuel combustion engine internally combusts the precombustion gas stream with a hydrocarbon fuel;
   collecting exhaust gas from the fuel combustion engine, wherein the collected exhaust gas comprises $CO_2$ created during fuel combustion, and wherein the collected exhaust gas comprises greater quantities of $CO_2$ than existed in the precombustion gas stream; and
   removing $O_2$ from the collected exhaust gas such that the collected exhaust gas comprises less than 5% $O_2$ by weight.

2. The method of claim 1, further comprising a step of recirculating a portion of the collected exhaust gas through one or more of:
   the fuel combustion engine; and
   a second fuel combustion engine with greater engine displacement, wherein the second fuel combustion engine is exclusively aspirated by non-atmospheric gases comprising the collected exhaust gas and an oxygen gas comprising more than 90% $O_2$ by weight.

3. The method of claim 1, further comprising the steps of:
repeatedly recirculating the collected exhaust gas through subsequent fuel combustion processes until contaminants in the collected exhaust gas exceed a predetermined threshold; and
releasing the collected exhaust gas into the atmosphere.

4. The method of claim 1, further comprising the step of circulating a portion of the collected exhaust gas through an oil-bearing subterranean stratum during an enhanced oil recovery (EOR), where in the collected exhaust gas serves as the working fluid in the EOR.

5. The method of claim 4, wherein the collected exhaust gas is stored in working fluid container prior to being used in EOR.

6. The method of claim 4, further comprising the steps of:
recollecting a portion of any collected exhaust gas used in EOR, wherein the collected exhaust gas was used as working fluid in the EOR and wherein the recollected exhaust gas is contaminated with unrefined hydrocarbons introduced to the recollected exhaust gas during EOR; and
aspirating a subsequent fuel combustion engine with the recollected exhaust gas, such that the unrefined hydrocarbon contaminants replace one of: all of the hydrocarbon fuel otherwise necessary to power the subsequent fuel combustion engine, and a portion of the hydrocarbon fuel otherwise necessary to power the fuel combustion engine.

7. The method of claim 1, further comprising the steps of:
cooling the collected exhaust gas; and
cleaning the collected exhaust gas by filtering one or more impurities harmful in EOR.

8. The method of claim 1, wherein the predetermined amount of oxygen gas is predetermined by referencing historical data to create optimal combustion performance in the fuel combustion engine.

9. The method of claim 1, further comprising the steps of:
diverting the $O_2$ removed from the collected exhaust gas to storage chamber; and
using the $O_2$ collected in the storage chamber to aspirate a subsequent fuel combustion engine.

10. The method of claim 1, wherein the hydrocarbon fuel comprises micronized petroleum coke slurry fuel.

11. The method of claim 1, further comprising the step of supplementing the sequestered $CO_2$ with $CO_2$ mined from a natural, subterranean, geological $CO_2$ reservoir.

12. The method of claim 1, further comprising separating $CO_2$ from atmospheric gases using an air separation unit such that the sequestered $CO_2$ gas comprises at least 90% $CO_2$ by weight.

13. A system to aspirate a fuel combustion engine with non-atmospheric gases to produce a subsequently useful byproduct, the system comprising:
a separator module configured to separate $CO_2$ from other atmospheric gases using an air separation unit such that the sequestered $CO_2$ gas comprises at least 90% $CO_2$ by weight;
a combination module configured to combine the sequestered $CO_2$ gas with a predetermined amount of oxygen gas comprising at least 90% $O_2$ by weight to create an precombustion gas stream consisting of the sequestered $CO_2$ gas and the oxygen gas;
an aspirator module configured to aspirate a fuel combustion engine exclusively with the precombustion gas stream, wherein the fuel combustion engine internally combusts the precombustion gas stream with a hydrocarbon fuel;
a collector module configured to collect exhaust gas from the fuel combustion engine, wherein the collected exhaust gas comprises $CO_2$ created during fuel combustion, and wherein the collected exhaust gas comprises greater quantities of $CO_2$ than existed in the precombustion gas stream;
a remover module configured to remove $O_2$ from the collected exhaust gas such that the collected exhaust gas comprises less than 5% $O_2$ by weight; and
a circulator module configured to circulate a portion of the collected exhaust gas through an oil-bearing subterranean stratum during an enhanced oil recovery (EOR), where in the collected exhaust gas serves as the working fluid in the EOR, wherein the collected exhaust gas is stored in working fluid container prior to being used in EOR.

14. The system of claim 13, further comprising:
a recollector module configured to recollect a portion of any collected exhaust gas used in EOR, wherein the collected exhaust gas was used as working fluid in the EOR and wherein the recollected exhaust gas is contaminated with unrefined hydrocarbons introduced to the recollected exhaust gas during EOR; and
a reaspirator module configured to aspirate a subsequent fuel combustion engine with the recollected exhaust gas, such that the unrefined hydrocarbon contaminants replace one of: all of the hydrocarbon fuel otherwise necessary to power the subsequent fuel combustion engine, and a portion of the hydrocarbon fuel otherwise necessary to power the fuel combustion engine.

15. The system of claim 13, further comprising the steps of:
a cooler module configured to cool the collected exhaust gas; and
a cleaner module configured to clean the collected exhaust gas by filtering one or more impurities harmful in EOR.

16. The system of claim 13, wherein the amount of oxygen gas combined with the sequestered $CO_2$ gas is predetermined by referencing historical data comprising optimal combustion performance fuel mixture ratios for the fuel combustion engine.

17. The system of claim 13, further comprising:
a divertor module diverting the $O_2$ removed from the collected exhaust gas to storage chamber; and
a storage module configured to store the $O_2$ collected in the storage chamber to aspirate a subsequent fuel combustion engine.

18. The system of claim 13, wherein the hydrocarbon fuel comprises micronized petroleum coke slurry fuel.

19. The system of claim 13, further comprising a supplementor module configured to supplement the sequestered $CO_2$ with $CO_2$ mined from a natural, subterranean, geological $CO_2$ reservoir.

* * * * *